United States Patent [19]

Ida et al.

[11] Patent Number: 4,713,980
[45] Date of Patent: Dec. 22, 1987

[54] LUBRICATION MECHANISM IN POWER TRANSFER DEVICE FOR FOUR WHEEL DRIVE

[75] Inventors: Shuichiro Ida; Toshio Yoshinaka; Shuji Nagano, all of Toyota, Japan

[73] Assignee: Toyota Jidosha Kabushiki Kaisha, Aichi, Japan

[21] Appl. No.: 866,911

[22] Filed: May 27, 1986

[30] Foreign Application Priority Data

May 24, 1985 [JP] Japan ................................ 60-112908

[51] Int. Cl.$^4$ ............................................. F16H 57/04
[52] U.S. Cl. ..................................... 74/467; 184/6–12
[58] Field of Search ........................ 74/467; 184/6–12

[56] References Cited

U.S. PATENT DOCUMENTS

| | | | |
|---|---|---|---|
| 2,017,101 | 10/1935 | Lapslely | 74/473 |
| 2,228,581 | 1/1941 | Olen | 74/310 |
| 2,479,838 | 8/1949 | Huston | 212/69 |
| 2,887,201 | 5/1959 | Willis | 192/67 |
| 2,968,196 | 1/1961 | Orr | 74/467 |
| 2,984,122 | 5/1961 | Wooley | 74/467 X |
| 3,097,546 | 7/1963 | Kelbel et al. | 74/467 X |
| 3,131,582 | 5/1964 | Kelbel | 74/467 X |
| 3,221,574 | 12/1965 | Sampietro et al. | 74/665 |
| 3,310,992 | 3/1967 | Stott | 74/473 |
| 3,431,791 | 3/1969 | Labat | 74/473 |
| 3,442,346 | 5/1969 | Winter et al. | 180/53 |
| 3,627,072 | 12/1971 | Smirl | 180/44 |
| 3,788,164 | 1/1974 | Ojima | 74/665 T |
| 3,935,752 | 2/1976 | Kelbel et al. | 74/473 R |
| 3,955,442 | 5/1976 | Kessmar | 74/665 GE |
| 4,048,870 | 9/1977 | Hulsebusch | 74/473 R |
| 4,103,753 | 8/1978 | Holdeman | 180/49 |
| 4,138,906 | 2/1979 | Nakao et al. | 74/674 |
| 4,197,760 | 4/1980 | Wolfe | 74/477 |
| 4,270,409 | 6/1981 | Glaze et al. | 74/665 GA |
| 4,290,318 | 9/1981 | Ookubo et al. | 74/477 |
| 4,292,860 | 10/1981 | Kako et al. | 74/665 GA |
| 4,297,910 | 11/1981 | Myers | 74/473 R |
| 4,298,085 | 11/1981 | Moroto et al. | 180/247 |
| 4,299,140 | 11/1981 | Kako et al. | 74/665 G |
| 4,305,309 | 12/1981 | Ookubo et al. | 74/477 |
| 4,373,604 | 2/1983 | Lunn et al. | 180/247 |
| 4,381,828 | 5/1983 | Lunn et al. | 180/247 |
| 4,404,869 | 9/1983 | Numazawa et al. | 74/740 |
| 4,422,349 | 12/1983 | Matsumoto et al. | 74/665 GE |
| 4,440,042 | 8/1984 | Holdeman | 74/785 |
| 4,452,331 | 6/1984 | Lunn et al. | 180/247 |
| 4,458,557 | 7/1984 | Hayakawa | 74/665 GE |
| 4,476,952 | 10/1984 | Suzuki | 180/247 |
| 4,489,626 | 12/1984 | Lemon | 74/781 R |
| 4,503,927 | 3/1985 | Hayakawa et al. | 180/247 |
| 4,541,503 | 9/1985 | Akutagawa et al. | 180/249 |
| 4,559,846 | 12/1985 | Cochran et al. | 74/665 GA |
| 4,577,524 | 3/1986 | Richards et al. | 74/467 X |
| 4,582,159 | 4/1986 | Suzuki | 180/247 |

FOREIGN PATENT DOCUMENTS

| | | |
|---|---|---|
| 169361 | 3/1951 | Austria . |
| 0022632 | 1/1981 | European Pat. Off. . |
| 7224282 | 9/1972 | Fed. Rep. of Germany . |
| 2515765 | 5/1983 | France . |
| 53121642 | 3/1952 | Japan . |
| 949029 | 2/1964 | United Kingdom . |
| 1291257 | 10/1972 | United Kingdom ............ 74/467 |
| 2103735 | 2/1983 | United Kingdom . |

*Primary Examiner*—Leslie Braun
*Assistant Examiner*—Dirk Wright
*Attorney, Agent, or Firm*—Parkhurst & Oliff

[57] ABSTRACT

A power transfer device adapted for use in combination with a power transmission. The transfer device includes a housing, an input shaft rotatably mounted within the housing for drive connection to an output shaft of the transmission, an output shaft rotatably mounted within the housing for rotation relative to the input shaft, a planetary gear unit arranged within the housing and having an input element mounted on the input shaft for rotation therewith and an output element connectable to the output shaft, and a sleeve member axially slidably mounted on the output shaft and shiftable between a first position in which it effects a drive connection between the input and output shafts and a second position in which it effects a drive connection between the output element of the gear unit and the output shaft. A bearing retainer is secured to the housing to retain a bearing carried on the housing for supporting thereon the input shaft, and an oil pump assembly is contained within a cavity of the bearing retainer and mounted on the input shaft at the outside of the housing to be driven by rotation of the input shaft. The pump assembly is arranged to pump up lubricating oil stored in the housing and supply it into an axial bore in the input shaft.

10 Claims, 9 Drawing Figures

LUBRICATION MECHANISM IN POWER TRANSFER DEVICE FOR FOUR WHEEL DRIVE

BACKGROUND OF THE INVENTION

1. Field of the Invention

The present invention relates to a power transfer device adapted for use in combination with a power transmission for a part-time four wheel drive vehicle to selectively transfer output drive torque of the power transmission to a pair of front road wheels and a pair of rear road wheels, and more particularly to a lubrication mechanism for an auxiliary change-speed mechanism in the power transfer device.

2. Description of the Prior Art

In U.S. Pat. No. 4,440,042 issued on Apr. 3, 1984, there has been proposed an auxiliary change-speed mechanism in the form of a helical planetary gear assembly which includes a housing, an input shaft rotatably mounted within the housing for drive connection to an output shaft of a power transmission, an output shaft arranged coaxially with the input shaft and rotatably mounted within the housing for rotation relative to the input shaft, a planetary gear unit having an input element mounted on the input shaft for rotation therewith and an output element connectable with the output shaft, and a collar of sleeve member axially slidably mounted on the output shaft and shiftable between a first position in which it effects a drive connection between the input and output shafts and a second position in which it effects a drive connection between the output element of the planetary gear unit and the output shaft.

In such a conventional auxiliary change-speed mechanism, it is required to forcibly supply a sufficient amount of lubricating oil to bearing and intermeshed portions of component parts of the change-speed mechanism without causing any increase in size of the power transfer device.

SUMMARY OF THE INVENTION

It is, therefore, a primary object of the present invention to provide an improved power transfer device wherein an oil pump assembly is arranged in a dead space around the outer end portion of the input shaft to constantly supply a sufficient amount of lubricating oil to bearing and intermeshed portions of component parts of the change-speed mechanism and wherein the oil pump assembly can be manufactured at a low cost.

According to the present invention, the primary object is accomplished by providing a power transfer device adapted for use in combination with a power transmission which transfer device comprises a housing adapted to be secured to one end of a casing of the power transmission, an input shaft rotatably mounted within the housing and having an input end for drive connection to an output shaft of the power transmission, an output shaft arranged coaxially with the input shaft and rotatably mounted within the housing for rotation relative to the input shaft, an auxiliary change-speed mechanism in the form of a planetary gear unit arranged within the housing and mounted on the input shaft, the planetary gear unit having an input element mounted on the input shaft for rotation therewith and an output element connectable to the output shaft, and a sleeve member axially slidably mounted on the output shaft and shiftable between a first position in which it effects a drive connection between the input and output shafts and a second position in which it effects a drive connection between the output element of the planetary gear unit and the output shaft, wherein a bearing retainer is secured in a fluid-tight manner to the housing to retain a bearing carried on the housing for supporting thereon the input shaft, and an oil pump assembly is contained within a cavity of the bearing retainer and mounted on the input shaft at the outside of the housing to be driven by rotation of the input shaft, the pump assembly being arranged to pump up lubricating oil stored in the housing and supply it into an axial bore in the input shaft.

Preferably, the oil pump assembly is in the form of a trochoid pump which comprises an inner rotor fixedly mounted on the input shaft for rotation therewith, an outer rotor arranged in surrounding relationship with the inner rotor and rotatably coupled within a cylindrical cavity of small diameter formed in the bearing retainer eccentrically with respect to the input shaft, an end plate coupled within a cylindrical cavity of large diameter formed in the bearing retainer concentrically with respect to the input shaft, the end plate being arranged to position the inner and outer rotors in place by slidable engagement therewith and having an inlet slot in open communication with a pump cavity formed between the inner and outer rotors and an outlet slot in open communication with the pump cavity, and a cover plate fixedly coupled within the cylindrical cavity of large diameter to fasten the end plate in place, the cover plate being formed with an inlet cavity in open communication with the inlet slot of the end plate and the interior of the housing and an outlet cavity in open communication with the outlet slot of the end plate and the axial bore in the input shaft.

BRIEF DESCRIPTION OF THE DRAWINGS

Other objects, features and advantages of the present invention will be readily appreciated as the same becomes better understood by reference to the following detailed description when considered in connection with the accompanying drawings, in which like reference characters and numerals designate the same or similar parts throughout the figures thereof and wherein.

DETAILED DESCRIPTION OF THE PREFERRED EMBODIMENTS

Figure 1:
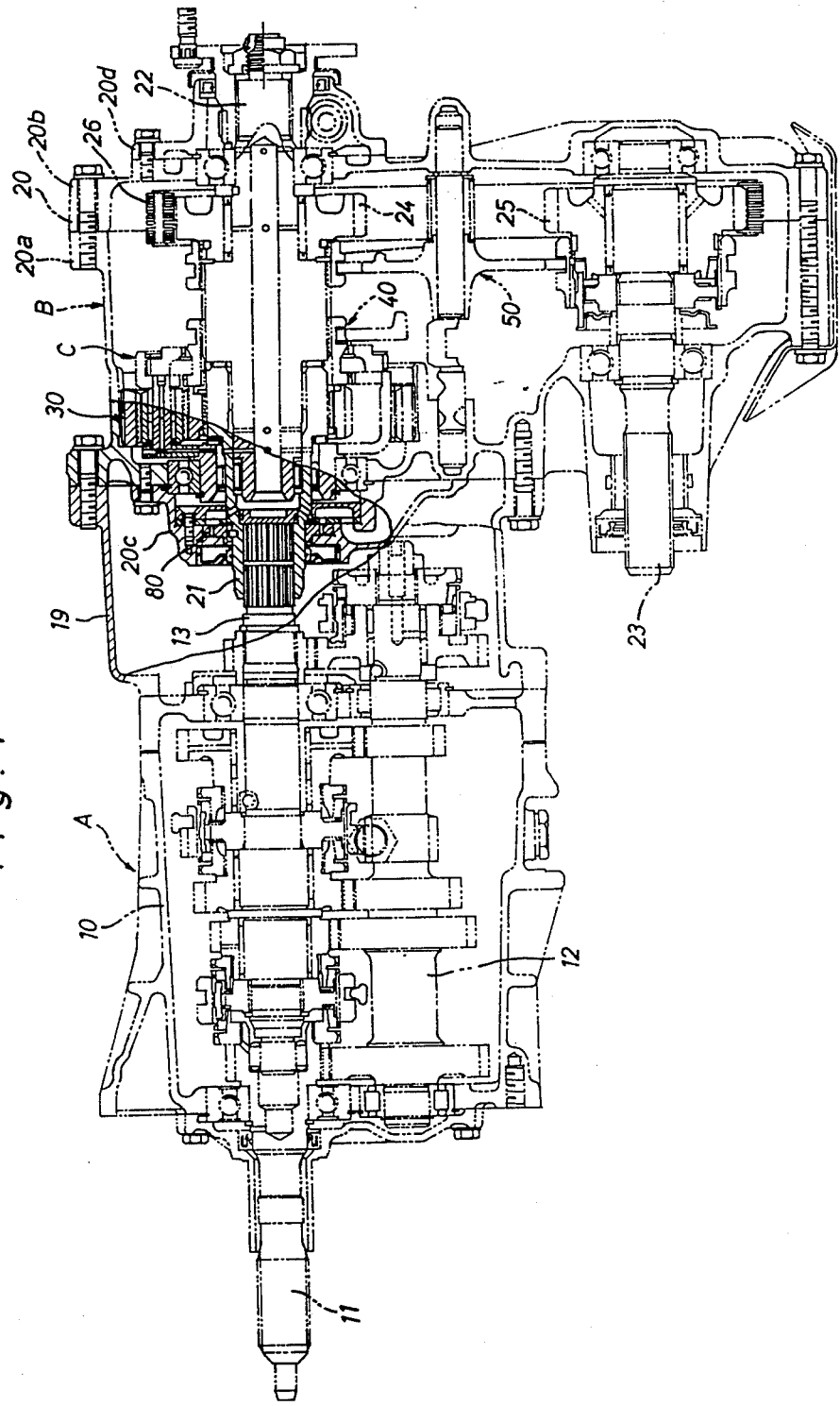
FIG. 1 is a partly sectioned side view of a power transfer device attached to a power transmission.
Figure 2:
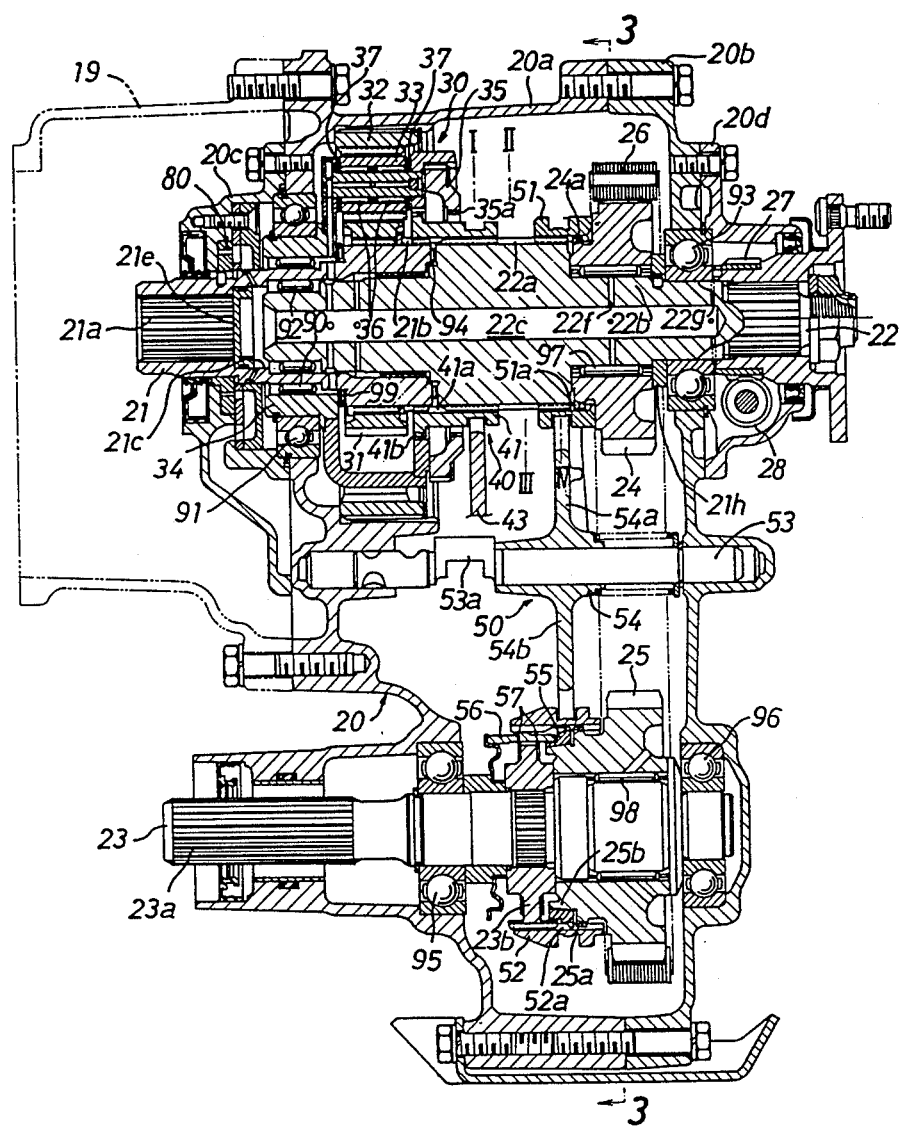
FIG. 2 is an enlarged full sectional view of the power transfer device shown in FIG. 1.

Referring now to the drawings, particularly in FIG. 1, there is illustrated a power transfer device B attached to a conventional primary power transmission A for an automotive vehicle of the part-time four-wheel drive type. The power transmission A includes an input shaft 11 for drive connection to an output shaft of a prime mover for the vehicle (not shown), a counter shaft 12 arranged in parallel with the input shaft 11, an output shaft 13 arranged coaxially with the input shaft 11, and a plurality of change-speed gears provided on the respective shafts 11, 12 and 13. As shown in FIGS. 1 and 2, the power transfer device B includes a housing assembly 20 secured to a right-hand end of a casing 10 of the power transmission A through an adapter casing 19, an input shaft 21, a first output shaft 22, a second output shaft 23, a drive sprocket 24, a driven sprocket 25, a drive chain 26, an auxiliary change-speed mechanism C in the form of a planetary gear unit 30, a first shift mechanism 40 for selectively providing a high speed drive or a low speed drive, and a second shift mechanism 50 for selectively providing a two-wheel drive or a four-wheel drive.

The housing assembly 20 consists of front and rear casings 20a and 20b secured to each other in a fluid-light manner, and the adapter casing 19 is arranged to be replaced with an extension housing when the transfer device B is removed. The input shaft 21 is in the form of a hollow shaft rotatably supported on a side wall of front casing 20a through a radial needle bearing 90, a carrier 34 of planetary gear unit 30, and a radial ball bearing 91. The input shaft 21 has an internally splined portion 21a for connection to the output shaft 13 of power transmission A, and an externally splined portion 21b for mounting thereon the planetary gear unit 30. An oil pump assembly 80 is mounted on the input shaft 21 at the outside of front casing 20a and contained within a bearing retainer 20c secured in a fluid-tight manner to the side wall of front casing 20a to supply lubricating oil to bearing portions and intermeshed portions in the transfer device, as will be described in detail later.

The first output shaft 22 is arranged coaxially with input shaft 21 and rotatably coupled at its left-hand end within the input shaft 22 through a radial needle bearing 92 for rotation relative to the input shaft 21. The first output shaft 22 is rotatably supported at an intermediate portion thereof on a side wall of rear casing 20b through a radial ball bearing 93. The first output shaft 22 is formed with an externally splined hub portion 22a and a journal portion 22b and is connected at the right-hand end thereof to rear wheel drive axles (not shown). In addition, a drive gear 28 in mesh with a driven gear 28 for a speedometer is fixedly mounted on the right-hand end portion of first output shaft 22 and contained within a bearing retainer 20d fitted in a fluid-tight manner to the side wall of rear casing 20b.

The second output shaft 23 is arranged in parallel with input and first output shafts 21 and 22 and rotatably supported by a pair of axially spaced radial ball bearings 95 and 96 carried respectively on both the side walls of front and rear casing 20a and 20b. The second output shaft 23 has an externally splined portion 23a at the left-hand end thereof for connection to front wheel drive axles (not shown). The drive sprocket 24 is rotatably supported on the journal portion 22b of first output shaft 22 through a radial needle bearing 97, the driven sprocket 25 on second output shaft 23 being similarly supported through a radial needel bearing 98. Both the drive sprocket 24 and driven sprocket 25 are drivingly connected to each other by means of the drive chain 26.

The planetary gear unit 30 comprises a sun gear 31 mounted in place on the externally splined portion 21b of input shaft 21 for rotation therewith, a stationary ring gear 32 arranged concentrically with sun gear 31 and secured to an internal cylindrical wall of front casing 20a, the carrier 34 rotatably arranged between sun gear 31 and ring gear 32, and a plurality of planetary gears 33 rotatably supported by carrier 34 and in mesh with sun gear 31 and ring gear 32. An annular side gear plate 35 is integrally fixed to the right-hand end of carrier 34 for rotation therewith and is formed with an internal spline 35a which is arranged to be engaged with a sleeve member 41 of the first shift mechanism 40. When the sleeve member 41 is axially moved to engage the internal spline 35a of side gear plate 35 at its external spline 41b, the planetary gear unit 30 acts to transfer drive torque from the input shaft 21 to the first output shaft 22 therethrough at a predetermined reduction speed ratio. In the planetary gear unit 30, a thrust needle bearing 99 is disposed between the carrier 34 and an annular stepped shoulder of input shaft 21, a pair of axially spaced radial needle bearings 36 are disposed between the planetary gear 33 and an axial portion of carrier 34, and a pair of axially spaced thrust metal bearings 37 are disposed between a pair of axially spaced arms of carrier 34 and opposite ends of the planetary gear 33.

Figure 3:
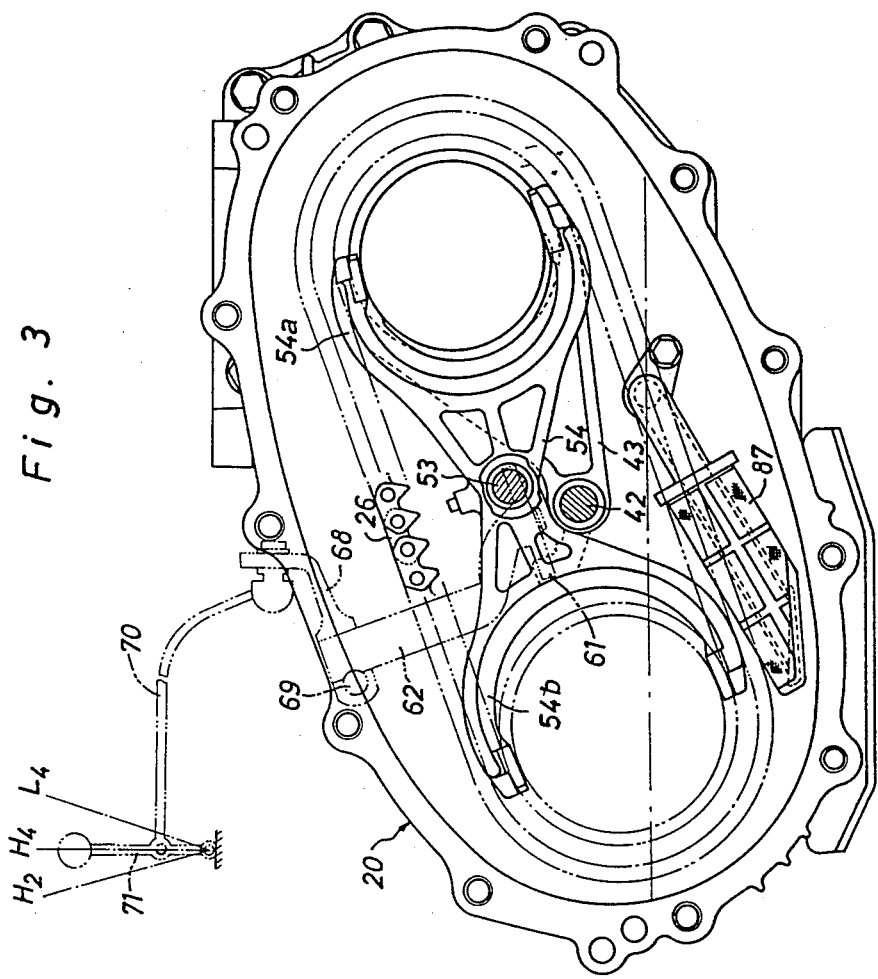
FIG. 3 is an end view taken along line 3—3 in FIG. 2 illustrating an arrangement of both shift rods and the associated shift forks in the transfer device.
Figure 4:
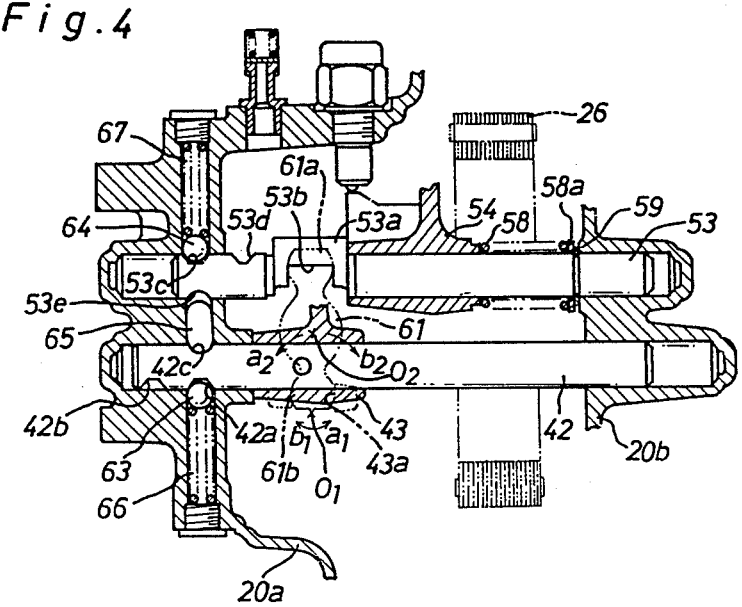
FIG. 4 is a sectional view illustrating the mounting of the respective shift rods within a housing assembly of the transfer device.

As is illustrated in FIGS. 2 to 4, the first shift mechanism 40 includes a shift rod 42 arranged in parallel with input and output shafts 21, 22, and a shift fork 43 fixed at a base portion thereof to an intermediate portion of shift rod 42 and coupled with the sleeve member 41. The sleeve member 41 has an internal spline 41a axially slidably engaged with the externally splined hub portion 22a of first output shaft 22 and engageable with the externally splined portion 21b of input shaft 21 when shifted leftward in the figure. As shown in FIG. 4, the shift rod 42 is axially slidably supported on both the side walls of front and rear casings 20a and 20b to be shifted by engagement with a swing lever 61 of the second shift mechanism 50. When the shift rod 42 is positioned to retain the shift fork 43 in a first position I as shown in FIG. 2, the sleeve member 41 is disengaged from the internal spline 35a of side gear plate 35 and engaged with the externally splined portion 21b of input shaft 21 to effect direct connection between input and output shafts 21 and 22. When the shift rod 42 is moved to shift the shift fork 43 to a second position II and retain it in the same position, the sleeve member 41 is disengaged from the externally splined portion 21b of input shaft 21 and engaged with the internal spline 35a of side gear plate 35 to drivingly connect the input shaft 21 to the first output shaft 22 through the planetary gear unit 30.

Figure 5:
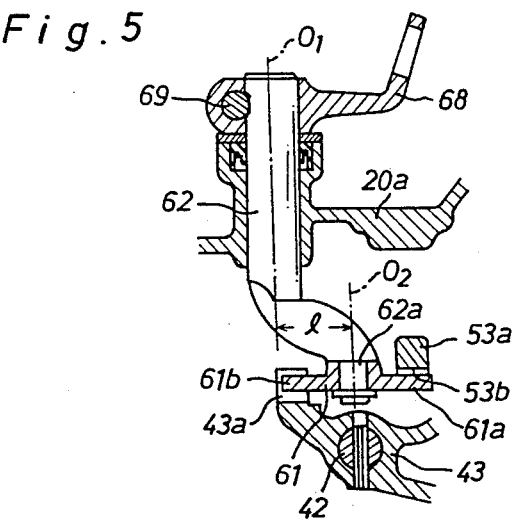
FIG. 5 is a sectional view illustrating the mounting of an operation rod in the transfer device.

As is illustrated in FIGS. 2 to 4, the second shift mechanism 50 includes a pair of sleeve members 51, 52, a shift rod 53 arranged between the output shafts 22, 23 and in parallel with the shift rod 42, a shift fork 54 axially slidably mounted on an intermediate portion of shift rod 53 and coupled with the sleeve members 51, 52, and an operation rod 62 provided at its lower end with the swing lever 61 (see FIG. 5). The first sleeve member 51 has an internal spline 51a axially slidably engaged with the externally spline hub portion 22a of first output shaft 22 and engageable with an external spline 24a formed on the left-hand end of drive sprocket 24. When the shift rod 53 is positioned to retain the shift fork 54 in a fourth position IV, as shown in FIG. 2, the first sleeve member 51 is engaged with the external spline 24a of drive sprocket 24 to rotate the drive sprocket 24 together with the first output shaft 22. When the shift rod 53 is moved to shift the shift fork 54 to a third position III and retain it in the same position, the first sleeve member 51 is disengaged from the external spline 24a of drive sprocket 24 to disconnect the drive sprocket 24 from the first output shaft 22.

The second sleeve member 52 has an internal spline 52a axially slidably engaged with an external spline of a clutch hub 23b which is fixedly mounted on the second output shaft 23. The internal spline 52a of sleeve member 52 is arranged to be engageable with an external spline 25a formed on the left-hand end of driven sprocket 25. When the shift rod 53 is positioned to retain the shift fork 54 in the fourth position IV, the second sleeve member 52 is engaged with the external spline 25a of driven sprocket 25 to rotate the second output shaft 23 together with the driven sprocket 25. When the shift rod 53 is moved to shift the shift fork 54 to the third position III, the second sleeve member 52 is disengaged from the external spline 25a of driven sprocket 25 to disconnect the second output shaft 23 from the driven sprocket 25. Arranged at the inner circumference of second sleeve member 52 is a synchronizer assembly of well-known type, which includes a conical hub portion 25b integrally formed on the left-hand end of driven sprocket 25, a synchronizer ring 55 mounted on the conical portion 25b of driven sprocket 25, a strut key 56, and a pair of retaining springs 57. When the second sleeve member 52 is moved from the third position III to the fourth position IV, the synchronizer assembly acts to establish a speed synchronization between the sprockets 24, 25 and the second output shaft 23 prior to engagement of the sleeve member 51 with the external spline 24a of drive sprocket 24.

As shown in FIG. 4, the shift rod 53 is axially slidably supported on both the side walls of front and rear casings 20a and 20b. The shift fork 54 is biased leftward by a compression coil spring 58 arranged about the shift rod 53 to resiliently abut against a stepped portion 53a formed on the shift rod 53 for its positioning. The compression coil spring 58 has one end engaged with the shift fork 54 and another end engaged with an annular retainer 58a which is received by an annular clip 59 fixed to the shift rod 53. As shown in FIG. 3, the shift fork 54 is integrally formed with a pair of fork portions 54a, 54b which are coupled with respective sleeve members 51 and 52 to move them as a unit. As shown in FIGS. 2 and 4, the shift rod 53 is formed at the underside of its stepped portion 53a with a recessed portion 53b which is engaged with one end portion 61a of swing lever 61. As shown in FIG. 5, the swing lever 61 is pivoted to an arm portion 62a formed at the lower end of operation rod 62 to be swung therewith, which operation rod 62 is inserted in a fluid-tight manner through a boss portion of front casing 20a and rotatably supported therethrough. The arm portion 62a has a pivot axis $O_2$ displaced in a distance l from the axis $O_1$ of operation rod 62. In operation, the one end portion 61a of swing lever 61 is pressed into contact with a side face of recessed portion 53b of shift rod 53 to cause axial movement of the shift rod 53, while the other end portion 61b of swing lever 61 is engaged with a recessed portion 43a formed in the base portion of shift fork 43 to cause axial movement of the shift rod 42.

As shown in FIG. 4, a pair of opposed detent balls 63, 64 and an interlock pin 65 are provided to selectively retain both the shift rods 42 and 53 in their shifted positions. The detent ball 63 is loaded by a compression spring 66 toward the shift rod 42 and selectively engageable with a pair of axially spaced recesses 42a and 42b formed in the shift rod 42. The detent ball 64 is loaded by a compression coil spring 67 toward the shift rod 53 and selectively engageable with a pair of axially spaced recesses 53c and 53d formed in the shift rod 53. The interlock pin 65 is arranged between the shift rods 42 and 53 to be selectively engaged with a pair of recesses 42c and 53e respectively formed in the shift rods 42 and 53. As shown in FIGS. 3 and 5, a connecting lever 68 is keyed at 69 to the outer end of operation rod 62 and is operatively connected to a manually operated transfer lever 71 through a push-pull cable 70 in such a manner that the operation rod 62 is rotated by shifting operation of the transfer lever 71 to swing the swing lever 61.

Assuming that the transfer lever 71 is retained in a position $H_4$ in FIG. 3 to provide a high speed four-wheel drive, the sleeve member 41 is retained in the first position I to directly connect the input shaft 21 to the first output shaft 22; and both the sleeve members 51, 52 are respectively retained in the fourth position IV to connect the first output shaft 22 to the drive sprocket 24 and to connect the second output shaft 23 to the driven sprocket 25. In such a condition, as shown in FIG. 4, the base portion of shift fork 43 is in abutment with an internal surface of the side wall of front casing 20a to restrict leftward movement of the shift rod 42, while the annular clip 51 is in abutment with an internal surface of the side wall of rear casing 20b to restrict rightward movement of the shift rod 53. In FIG. 4, the reference character $O_1$ indicates the rotation center of operation rod 62, and the reference numeral $O_2$ indicates the rotation center of swing lever 61.

When the transfer lever 71 is shifted from the position $H_4$ to a position $H_2$ in FIG. 3 to provide a high speed two-wheel drive, the operation rod 62 is rotated in a direction shown by an arrow $a_1$ in FIG. 4 through the push-pull cable 70 and connecting lever 68. This causes the rotation center $O_2$ of swing lever 61 to rotate in a direction shown by an arrow $a_2$ in FIG. 4. In this instance, the other end portion 61b of swing lever 61 is retained as a fulcrum so that the one end portion 61a of swing lever 61 swings to move the shift rod 53 leftward. Thus, the shift fork 54 is shifted leftward under load of the compression coil spring 58 to move both the sleeve members 51, 52 from the fourth position IV to the third position III thereby to disengage the first output shaft 22 from the drive sprocket 24 as well as the second output shaft 23 from the driven sprocket 25. If the sleeve members 51, 52 are being applied with a large torque, the compression coil spring 58 will act to effect the leftward movement of shift fork 54 after decrease of the torque. In this condition, the interlock pin 65 is maintained in engagement with the recess 42c to retain the shift 42 in place, and the detent ball 64 is maintained in engagement with the recess 53d to retain the shift rod 53 in its shifted position. When the transfer lever 71 is shifted from the position $H_2$ to the position $H_4$, the swing lever 61 is caused to swing in a reverse direction about the other end portion 61b thereof to move the shift rod 53 rightward.

When the transfer lever 71 is shifted from the position $H_4$ to a position $L_4$ in FIG. 3. to provide a low speed four-wheel drive, the operation rod 62 is rotated in a direction shown by an arrow $b_1$ in FIG. 4 through the push-pull cable 70 and connecting lever 68. This causes the rotation center $O_2$ of swing lever 61 to rotate in a direction shown by an arrow $b_2$. In this instance, the one end portion 61a of swing lever 61 is retained as a fulcrum so that the other end portion 61b of swing lever 61 swings to move the shift rod 43 rightward. Thus, the sleeve member 41 is caused to move to the second position II in FIG. 2 to connect the input shaft 21 to the first output shaft 22 through the planetary gear unit 30. In such a condition, the interlock pin 65 is maintained in engagement with the recess 53e of shift rod 53 to retain the shift rod 53 in place, and the detent ball 63 is maintained in engagement with the recess 42b of shift rod 42 to retain the shift rod 42 in its shifted position. When the transfer lever 71 is shifted from the position $L_4$ to the position $H_4$, the swing lever 61 is caused to swing in a reverse direction about the one end portion 61a thereof to move the shift rod 42 leftward.

Figure 6:
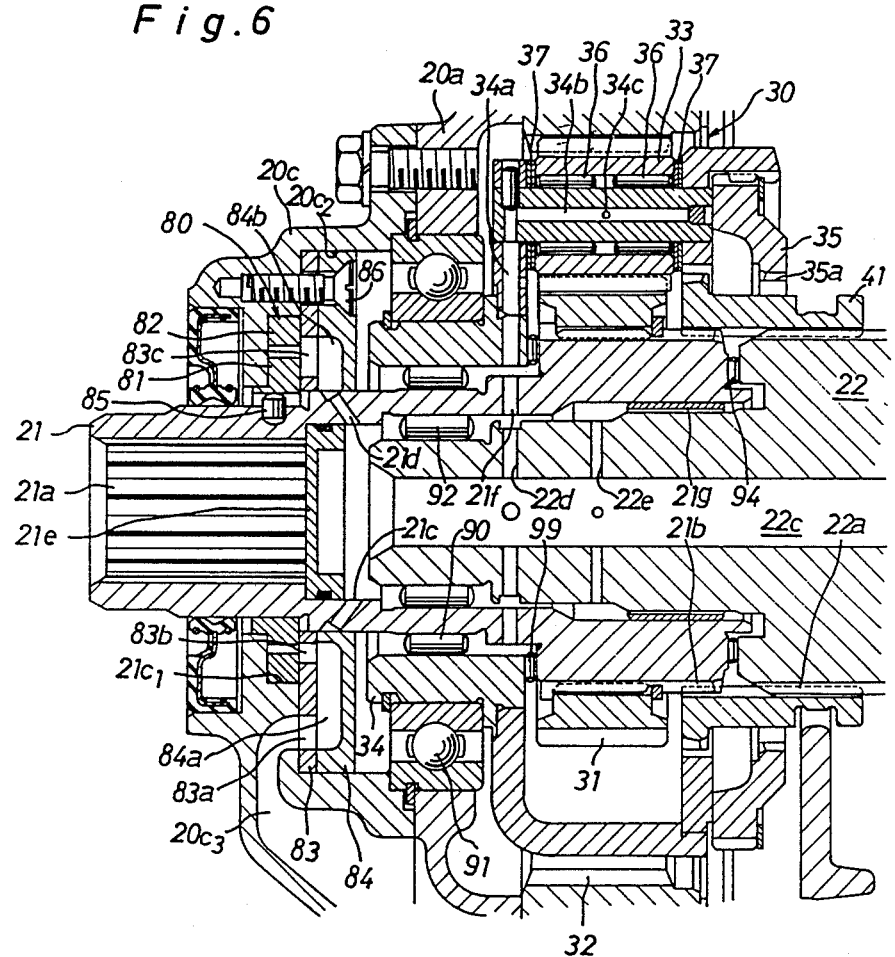
FIG. 6 is an enlarged sectional view illustrating component parts of an oil pump assembly mounted on an input shaft of the transfer device.
Figure 7:
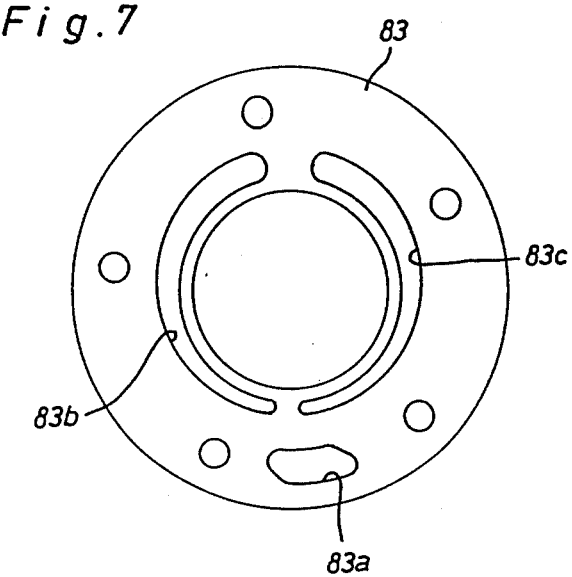
FIG. 7 is a front view of an end plate of the oil pump assembly shown in FIG. 6.
Figure 8:
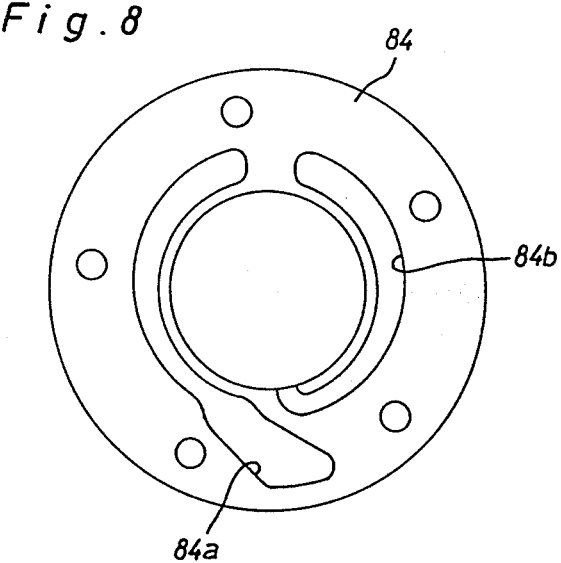
FIG. 8 is a front view of a cover plate of the oil pump assembly shown in FIG. 6.

In this embodiment, as shown in FIGS. 1, 2 and 6, the oil pump assembly 80 in bearing retainer 20c is in the form of a trochoid pump or gear pump which is driven by rotation of the input shaft 21 to pump up lubricating oil stored in the housing assembly 20 and supply it to the bearings 90, 91, 92, 93, 94, 97 and 99, the bearings 36 and 37, each sliding portion of sleeve members 41 and 51, the intermeshed portions of respective gears in the planetary gear unit 30, and the intermeshed portion of drive gear 27 and driven gear 28. When the transfer device B is stopping, the level of lubricating oil in housing assembly 20 is maintained as shown by a dot-dash line in FIG. 3. The oil pump assembly 80 comprises an inner rotor 81 fixedly mounted on the input shaft 21 by means of a radial pin 85 for rotation therewith, and an outer rotor 82 arranged in surrounding relationship with the inner rotor 81 and rotatably coupled within a cylindrical cavity $21c_1$ of small diameter which is formed in bearing retainer 20c eccentrically with respect to the input shaft 21. The inner and outer rotors 81 and 82 are positioned in place by slidable engagement with an end plate 83 which is coupled within a cylindrical cavity $20c_2$ of large diameter formed in bearing retainer 20c concentrically with respect to the input shaft 21. The end plate 83 is made of pressed sheet metal and fixed in place by engagement with a cover plate 84 which is coupled within the cylindrical cavity $20c_2$ and fastened in place by screws 86 threaded into bearing retainer 20c therethrough As shown in FIGS. 6 and 7, the end plate 83 is formed with an opening 83a in open communication with an introductory passage $20c_3$ formed in bearing retainer 20c, a semi-circular inlet slot 83b in open communication with a pump cavity formed between the inner and outer rotors 81 and 82, and a semi-circular outlet slot 83c in open communication with the pump cavity. The introductory passage $20c_3$ communicates into the bottom portion of housing assembly 20 through an oil strainer 87 shown in FIG. 3. As shown in FIGS. 6 and 8, the cover plate 84 is made of die casted aluminum and formed with a semi-circular cavity 84a in open communication with the opening 83a and inlet slot 83b of end plate 83 and a semi-circular cavity 84b in open communication with the outlet slot 83c of end plate 83 and radial passages 21d in the input shaft 21.

In operation, the inner rotor 81 of oil pump assembly 80 is driven by rotation of the input shaft 21 and cooperates with the outer rotor 82 to pump up the lubricating oil from the bottom portion of housing assembly 20 through the oil strainer 87, introductory passage $20c_3$, opening 83a, cavity 84a and inlet slot 83b. The lubrication oil under pressure discharged from the outlet slot 83c flows into an axial bore 21c of input shaft 21 through the cavity 84b and radial passages 21d to lubricate the bearing 92 and flows into radial passages 22d, 22e, 22f and 22g through an axial bore 22c in the output shaft 22. The axial bore 21c is closed by a plug 21e coupled within the input shaft 21. The lubricating oil from radial passage 22d flows into a radial passage 21f in input shaft 21 to lubricate the bearings 90, 99 and flows into passages 34a, 34b and 34c in carrier 34 to lubricate the bearings 36 and 37. The lubricating oil passed through bearing 90 flows to lubricate the bearing 91 and the intermeshed portion of gears 32, 33. The lubricating oil passed through bearings 99, 36, 37 flows to lubricate the intermeshed portion of gears 31, 33.

The lubricating oil from radial passage 22e flows to lubricate a throttle bush 21g coupled within the input shaft 21 and flows to lubricate a radial needle bearing 94 between input and output shafts 21 and 22 and to lubricate sliding portions between the sleeve member 41 and external splines 21b, 22a. The lubricating oil from radial passage 22f flows to lubricate the bearing 97, sliding portions between the sleeve member 51 and external splines 22a, 24a, and an annular spacer 21h between drive sprocket 24 and bearing 93. The lubricating oil from radial passage 22g flows into the interior of bearing retainer 20d to lubricate the intermeshed portion of gears 27, 28 and the bearing 93.

From the above description, it will be understood that the bearing retainer 20c is utilized to contain therein the oil pump assembly 80 coaxially with the input shaft 21. This is useful to dispose the oil pump assembly 80 in a dead space around the outer end portion of input shaft 21 for connection to the output shaft 13 of power transmission A. In the transfer device B, the bearing retainer 20c is further utilized to form a housing of the oil pump assembly 80, and the input shaft 21 is adapted to drive the inner rotor 81 of oil pump assembly 80 through radial pin 85. This is also useful to reduce components of the oil pump assembly 80 and to mount the oil pump assembly 80 in a simple manner so as to reduce the manufacturing cost of the transfer device. Additionally, it is able to constantly supply a sufficient amount of lubricating oil to the bearing portions and sliding portions in the transfer device regardless of operating condition of the transfer device. Furthermore, it will be understood that the cover plate 84 is coupled within the cylindrical cavity $21c_2$ of bearing retainer 20c to introduce the discharged lubricating oil from the outlet slot 83c of end plate 83 into the axial bore 21c in input shaft 21 through radial passages 21d. This is useful to supply the lubricating oil to the bearing portions and sliding portions in the transfer device in a simple construction.

Figure 9:
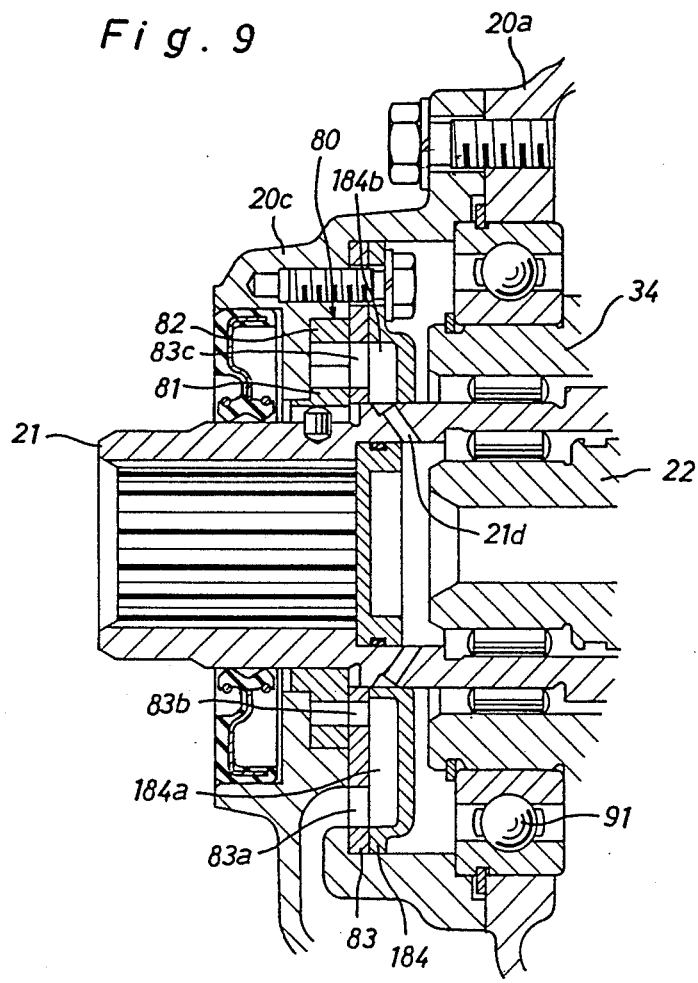
FIG. 9 is an enlarged sectional view illustrating a modification of the oil pump assembly.

In FIG. 9 there is illustrated a modification of the oil pump assembly 80 wherein a cover plate 184 of pressed sheet metal is replaced with the cover plate 84 of die casted aluminum to reduce manufacturing cost of the pump assembly. In this modification, the cover plate 184 is pressed to form semi-circular cavities 184a and 184b respectively corresponding with the semi-circular cavities 84a and 84b shown in FIG. 8.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is, therefore, to be understood that within the scope of the appended claims, the invention may be practiced otherwise than as specifically set forth herein.

What is claimed is:

1. A power transfer device adapted for use in combination with a primary power transmission for automotive vehicles, comprising:

a housing;
   an input shaft rotatably mounted within said housing and having an input end for drive connection to an output shaft of said power transmission;
   an output shaft arranged coaxially with said input shaft and rotatably mounted within said housing for relative rotation to said input shaft;
   an auxiliary change-speed mechanism arranged within said housing and mounted on said input shaft, said change-speed mechanism having an input element mounted on said input shaft for rotation therewith and an output element connectable to said output shaft; and
   a sleeve member axially slidably mounted on said output shaft and shiftable between a first position in which it effects a drive connection between said input and output shafts and a second position in which it effects a drive connection between the output element of said change-speed mechanism and said output shaft;
   wherein a bearing retainer is secured in a fluid-tight manner to an outer end of said housing, said bearing retainer retaining a bearing carried on said housing for supporting thereon said input shaft, and wherein an oil pump assembly is contained within a cavity of said bearing retainer and mounted on said input shaft at the outside of said housing to be driven by rotation of said input shaft, said pump assembly being arranged to pump up lubricating oil stored in said housing and supply it into an axial bore in said input shaft adjacent to said pump assembly.

2. A power transfer device as claimed in claim 1, wherein said oil pump assembly is in the form of a trochoid pump which comprises an inner rotor fixedly mounted on said input shaft for rotation therewith, an outer rotor arranged in surrounding relationship with said inner rotor and rotatably coupled within a cylindrical cavity of small diameter formed in said bearing retainer eccentrically with respect to said input shaft, an end plate coupled within a cylindrical cavity of large diameter formed in said bearing retainer concentrically with respect to said input shaft, said end plate being arranged to position said inner and outer rotors in place by slidable engagement therewith and having an inlet slot in open communication with a pump cavity formed between said inner and outer rotors and an outlet slot in open communication with the pump cavity, and a cover plate fixedly coupled within said cylindrical cavity of large diameter to fasten said end plate in place, said cover plate being formed with an inlet cavity in open communication with the interior of said housing and the inlet slot of said end plate and an outlet cavity in open communication with the outlet slot of said end plate and the axial bore in said input shaft adjacent to said cover plate.

3. A power transfer device as claimed in claim 2, wherein said end plate is made of pressed sheet metal, and said cover plate is made of die casted aluminum.

4. A power transfer device as claimed in claim 2, wherein said end plate and said cover plate each are made of pressed sheet metal.

5. A power transfer device as claimed in claim 1, wherein said change-speed mechanism is a planetary gear unit having an input element mounted on said input shaft for rotation therewith and an output element connectable to said output shaft.

6. A power transfer device as claimed in claim 5, wherein said planetary gear unit includes a carrier rotatably supported by said bearing retained by said bearing retainer for carrying a plurality of planetary gears in mesh with a sun gear mounted on said input shaft.

7. A power transfer device as claimed in claim 2, wherein said input shaft is in the form of a hollow shaft forming said axial bore therein and being formed with a radial passage for fluid communication between the outlet cavity of said cover plate and said axial bore in said hollow shaft.

8. A power transfer device adapted for use in combination with a primary power transmission for automotive vehicles, comprising:

a housing adapated to be secured to one end of a casing of said power transmission through an adapter casing;
   an input shaft rotatably mounted within said housing and having an input end for drive connection to an output shaft of said power transmission;
   an output shaft arranged coaxially with said input shaft and rotatably mounted within said housing for relative rotation to said input shaft;
   an auxiliary change-speed mechanism arranged within said housing and mounted on said input shaft, said change-speed mechanism having an input element mounted on said input shaft for rotation therewith and an output element connectable to said output shaft; and
   a sleeve member axially slidably mounted on said output shaft and shiftable between a first position in which it effects a drive connection between said input and output shafts and a second position in which it effects a drive connection between the output element of said change-speed mechanism and said output shaft;
   wherein a bearing retainer is arranged within an interior of said adapter casing and secured in a fluid-tight manner to an outer end of said housing, said bearing retainer retaining a bearing carried on said housing for supporting thereon said input shaft; and wherein an oil pump assembly is contained within a cavity of said bearing retainer and mounted on said input shaft at the outside of said housing to be driven by rotation of said input shaft, said pump assembly being arranged to pump up lubricating oil stored in said housing and supply it into an axial bore in said input shaft adjacent to said pump assembly.

9. A power transfer device as claimed in claim 8, wherein said oil pump assembly comprises an inner rotor mounted on said input shaft for rotation therewith, an outer rotor arranged in surrounding relationship with said inner rotor and rotatably coupled within a cylindrical cavity of small diameter formed in said bearing retainer eccentrically with respect to said input shaft, an end plate coupled within a cylindrical cavity of large diameter formed in said bearing retainer concentrically with respect to said input shaft, said end plate being arranged to position said inner and outer rotors in place by slidable engagement therewith and having a semi-circular inlet slot in open communication with a pump cavity formed between said inner and outer rotors and a semi-circular outlet slot in open communication with the pump cavity, and a cover plate fixedly coupled with said cylindrical cavity of large diameter to fasten said end plate in place, said cover plate being formed with a semi-circular inlet cavity in open communication with the interior of said housing and the inlet slot of said end plate and a semi-circular outlet cavity in open communication with the outlet slot of said end plate and the axial bore in said input shaft adjacent to said cover plate.

10. A power transfer device as claimed in claim 9, wherein said end plate is formed with an opening for fluid communication between an interior of said housing and the inlet cavity of said cover plate.

* * * * *